Aug. 22, 1939.  H. B. TUTHILL ET AL  2,170,312
COMBINATION BREAD SLICING AND WRAPPING MACHINE
Filed June 15, 1938   8 Sheets-Sheet 1

Inventors
Howard B. Tuthill
Harry F. Caldwell
By Lioeame and
Van Antwerp
Attorneys

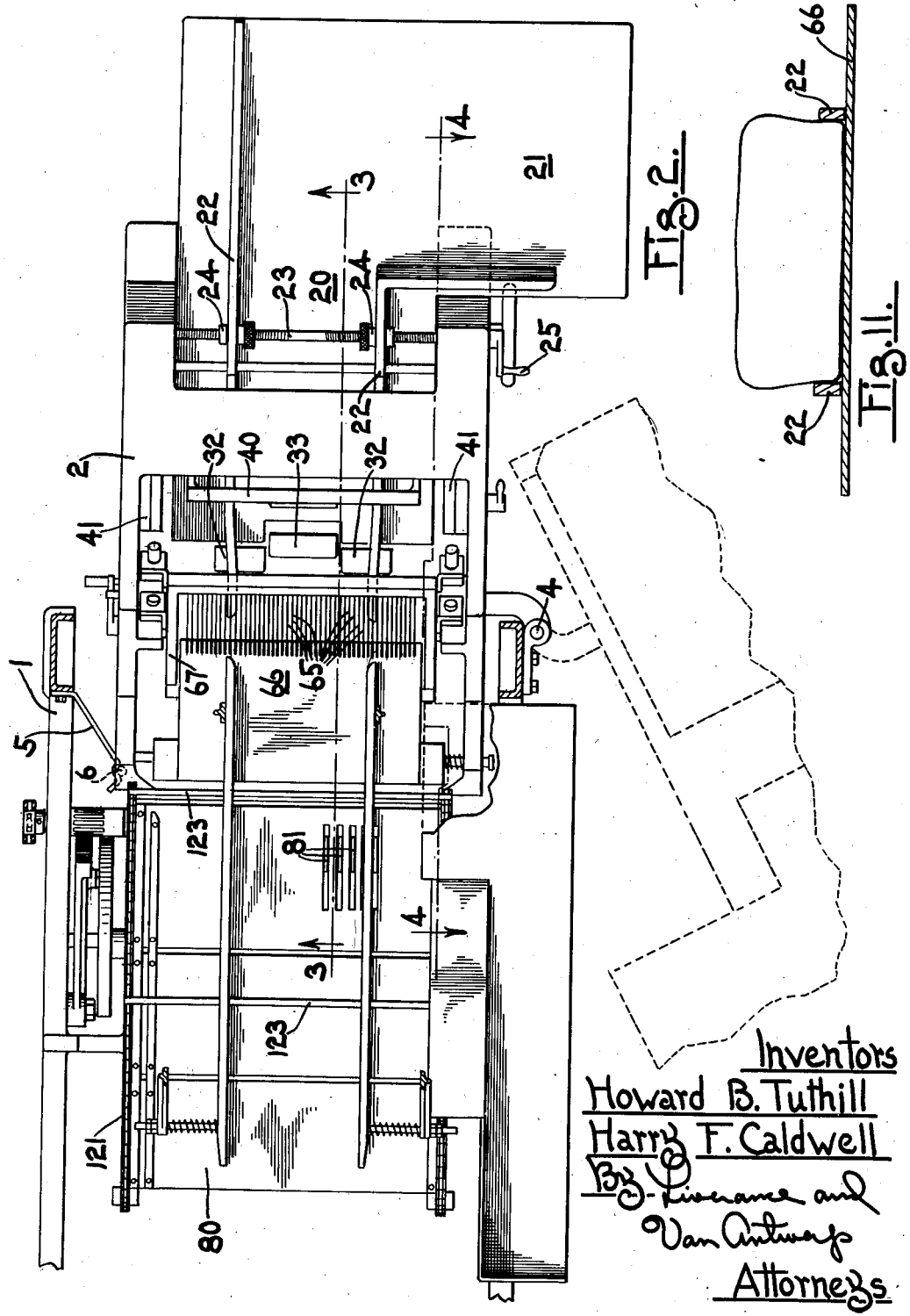

Aug. 22, 1939.  H. B. TUTHILL ET AL  2,170,312
COMBINATION BREAD SLICING AND WRAPPING MACHINE
Filed June 15, 1938  8 Sheets-Sheet 3

Inventors
Howard B. Tuthill
Harry F. Caldwell
By Liverance and
Van Antwerp
Attorneys

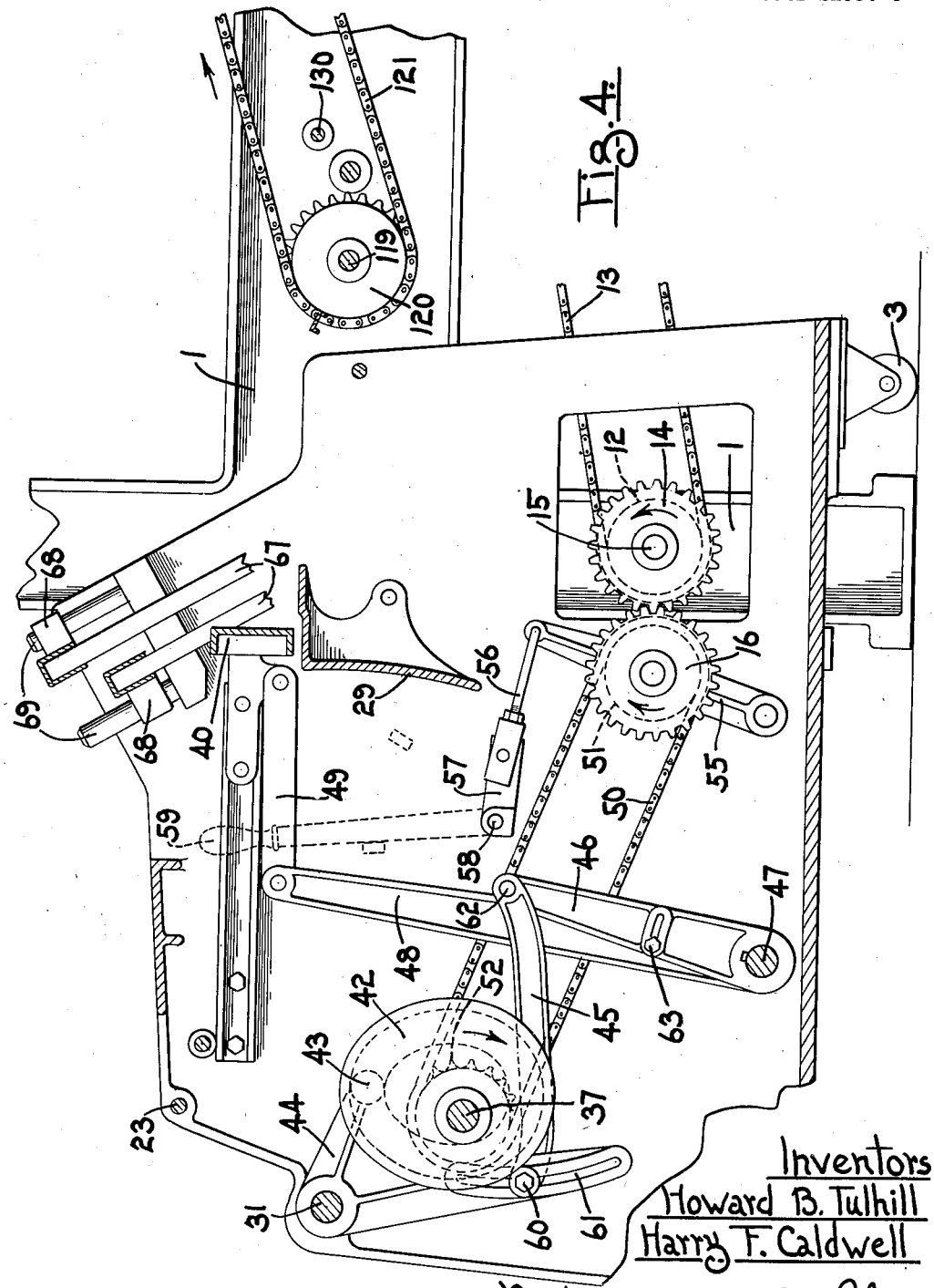

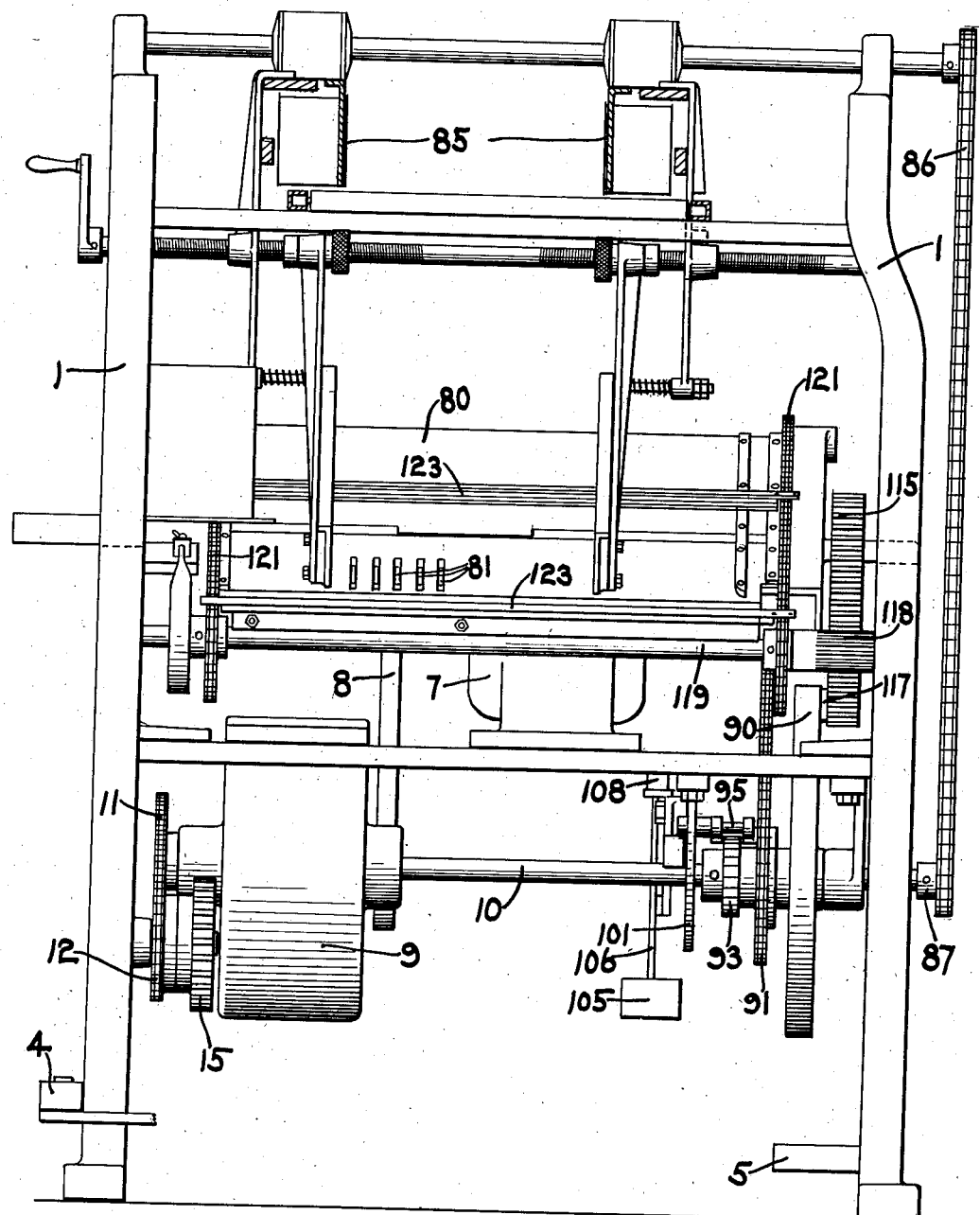

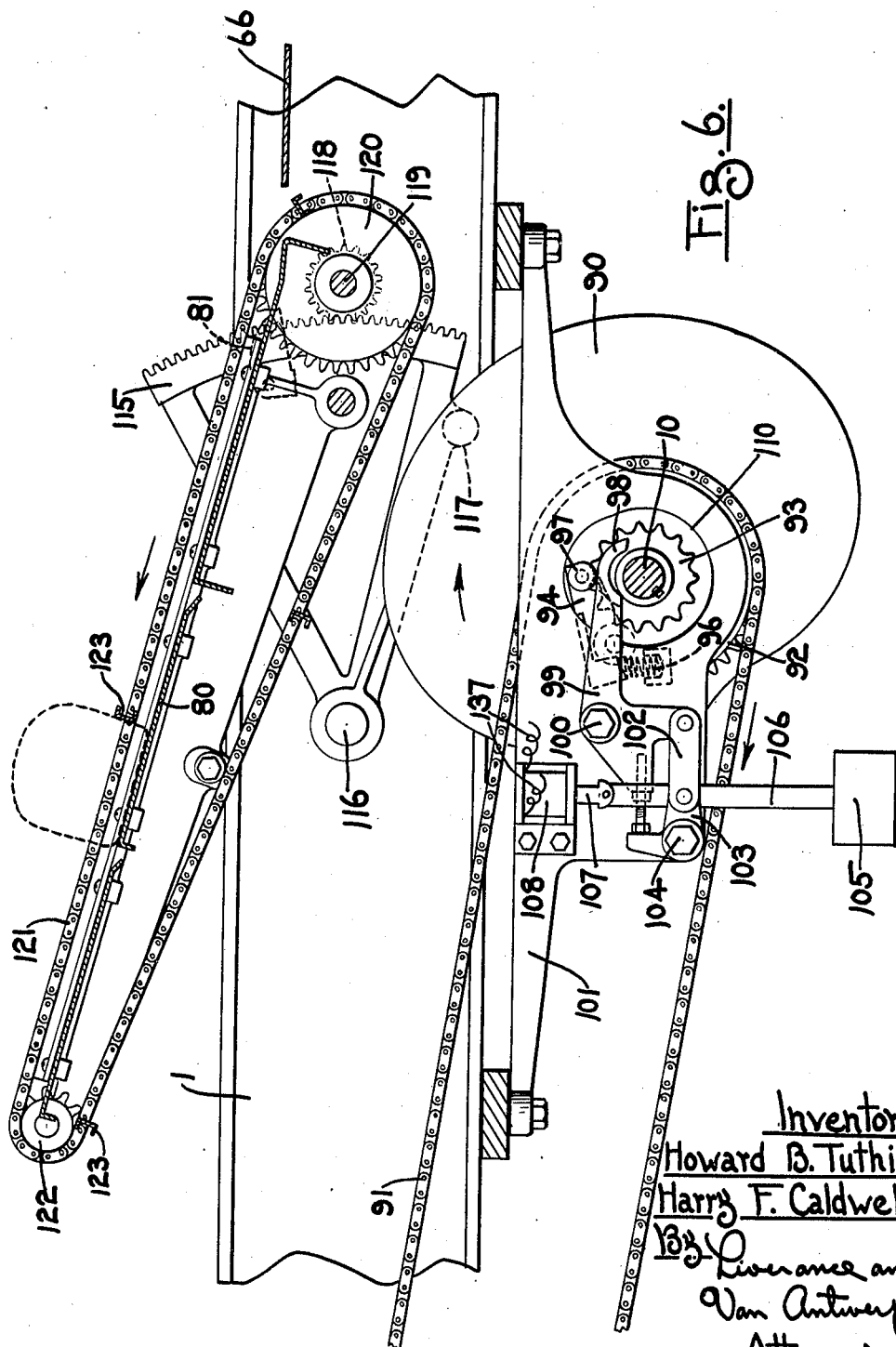

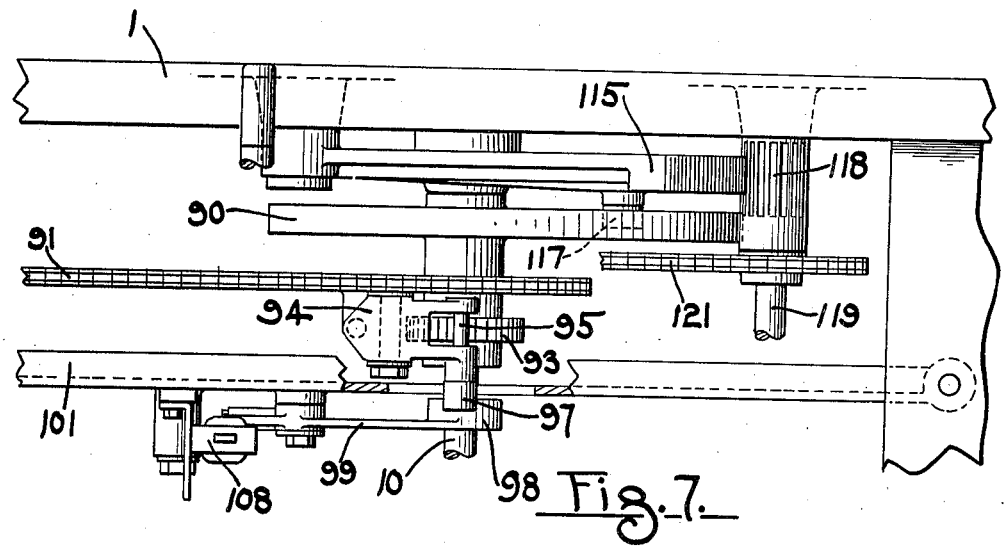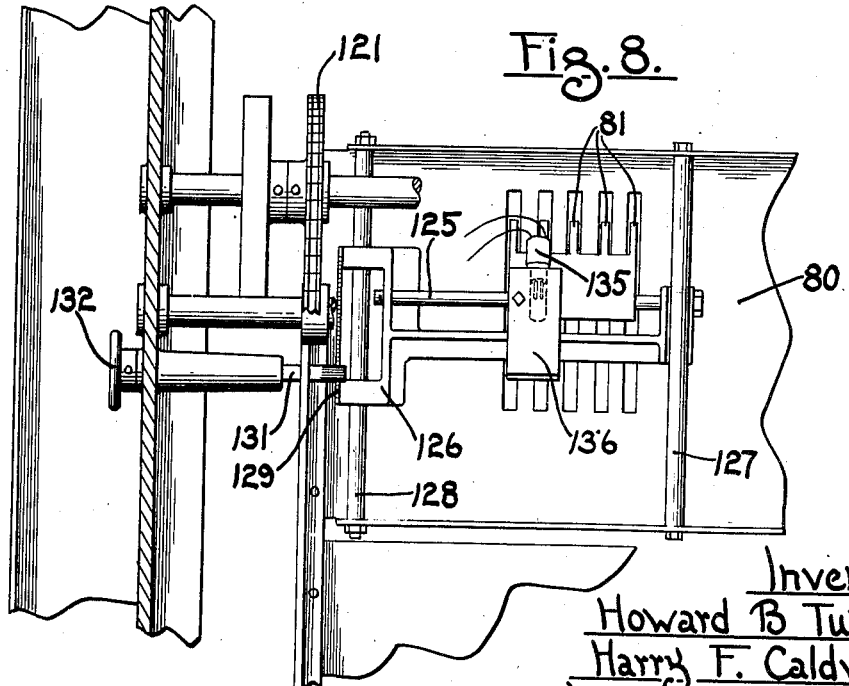

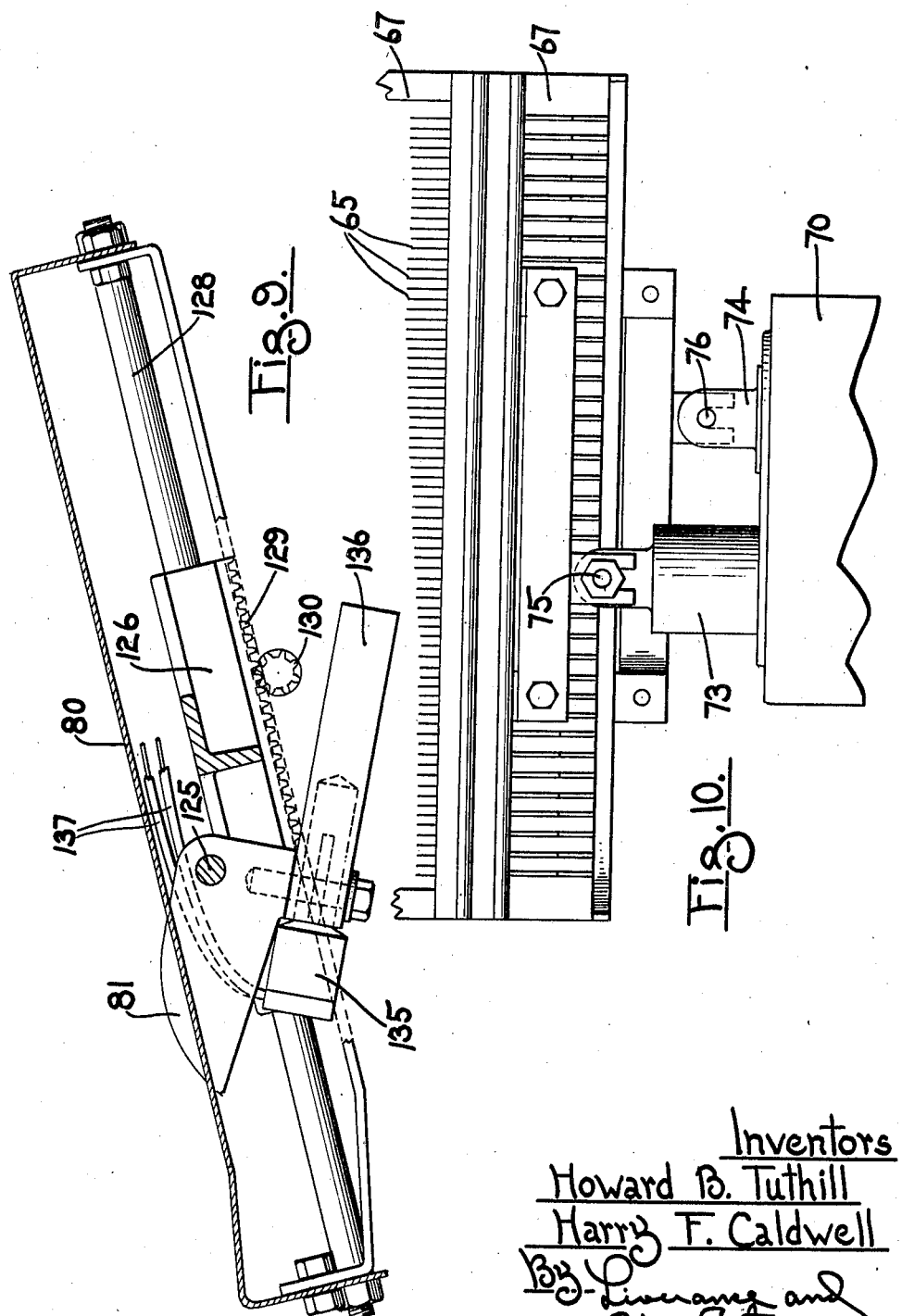

Patented Aug. 22, 1939

2,170,312

UNITED STATES PATENT OFFICE 2,170,312

COMBINATION BREAD SLICING AND WRAPPING MACHINE

Howard B. Tuthill and Harry F. Caldwell, Grand Rapids, Mich., assignors to Oliver Machinery Company, Grand Rapids, Mich., a corporation of Michigan Application June 15, 1938, Serial No. 213,806

17 Claims. (Cl. 93—2)

This invention relates to a combined bread slicing and wrapping machine for the purpose of automatically slicing loaves of bread and wrapping the sliced loaves in consecutive order on large scale production in commercial bakeries.

The loaves of bread are manually fed into a chute in the slicing machine from where they are consecutively automatically fed at timed intervals to a position from where they are pushed through the slicing knives at the same timed intervals. From the slicing knives the sliced loaves are moved at the same timed intervals and deposited consecutively on a conveyor in the bread wrapping machine. The automatic feeding device of the slicing machine is driven by, and in timed relation with, the bread wrapping mechanism. The bread wrapping mechanism performs cycles of operation in each of which a loaf of bread is wrapped and the feeding mechanism of the slicing machine operates at a speed which will not deposit loaves into the wrapping mechanism faster than the consecutive cycles of the wrapping mechanism occur and preferably, as a safety factor, the speed of depositing loaves from the slicer into the wrapper is slightly less than the capacity speed of the wrapper.

The wrapping mechanism is provided with a clutch tripping mechanism operated by deposit of loaves from the slicer into the wrapper whereby the wrapper will actuate to perform a cycle of wrapping operations only as often as loaves of bread are deposited into it.

The bread slicer unit is pivotally connected to the bread wrapper unit which will enable the slicer to be swung relative to the wrapper thus exposing the open ends of both the slicing unit and the wrapping unit which gives convenient accessibility to the interior of both units for adjustment, replacement or repair of the machinery.

When the slicing unit is swung with relation to the wrapping unit it moves into a position on the bakery floor which is ordinarily provided for work space when the machine is in operation and which is not necessary for work space when the machine is not in operation and therefore operating space in the bakery is conserved and minimized.

The gears which drive the feeding mechanism of the slicer from the driving mechanism of the wrapping unit may separate or demesh when the slicing unit is swung out of operating position but when moved back into operating position these driving gears remesh for driving operation. The units are designed to cooperate so that the driving gears from one to the other need not mesh in any certain synchronized relation it merely being necessary that the speed ratios of operation of the two units be maintained without the necessity of synchronization of the movements of the parts of the respective units.

This invention does not involve the specific bread wrapping mechanism to any further extent than a bread wrapper driving mechanism which combines to drive the slicing unit feeding mechanism, a single cycle clutch to actuate the wrapping mechanism, a conveyor onto which loaves are deposited from the slicing unit and a tripping member actuated by the loaves deposited into the wrapping unit to actuate the clutch. The specific wrapping mechanism may be that which is shown in our copending patent application, filed December 21, 1938, Serial No. 247,063 or other bread wrapping mechanism.

The invention is hereafter more fully described and particularly pointed out in the claims, reference being had to the accompanying drawings, in which:

Fig. 2 is a sectional plan view of the same on the line 2—2 of Fig. 1 with a part of the wrapping machine removed.

Fig. 3 is an enlarged sectional elevation of the slicing unit with parts broken away and the adjacent portion of the wrapping unit on the line 3—3 of Fig. 2.

Fig. 4 is a sectional elevation on the line 4—4 of Fig. 2 showing the parts of Fig. 3 viewed from the opposite direction.

Fig. 5 is a vertical end view of the bread wrapping unit with the slicing unit removed.

Fig. 6 is an enlarged sectional elevation of parts of the wrapping unit including the loaf conveyor and single cycle clutch.

Fig. 7 is a fragmentary plan view of the single cycle clutch mechanism and conveyor drive members.

Fig. 8 is an inverted fragmentary plan view of parts of the conveyor and load operated clutch tripping mechanism.

Fig. 9 is a sectional elevation of a part of the conveyor platform with the clutch tripping mechanism thereon.

Fig. 10 is a fragmentary elevation of the slicing knife frames and mounting and driving mechanism therefor.

Fig. 11 is a fragmentary sectional elevation showing a loaf of bread upon the slicing table guided at its lower portion beneath the upper overhanging part.

Like numbers refer to like parts in all the figures.

Figure 1:
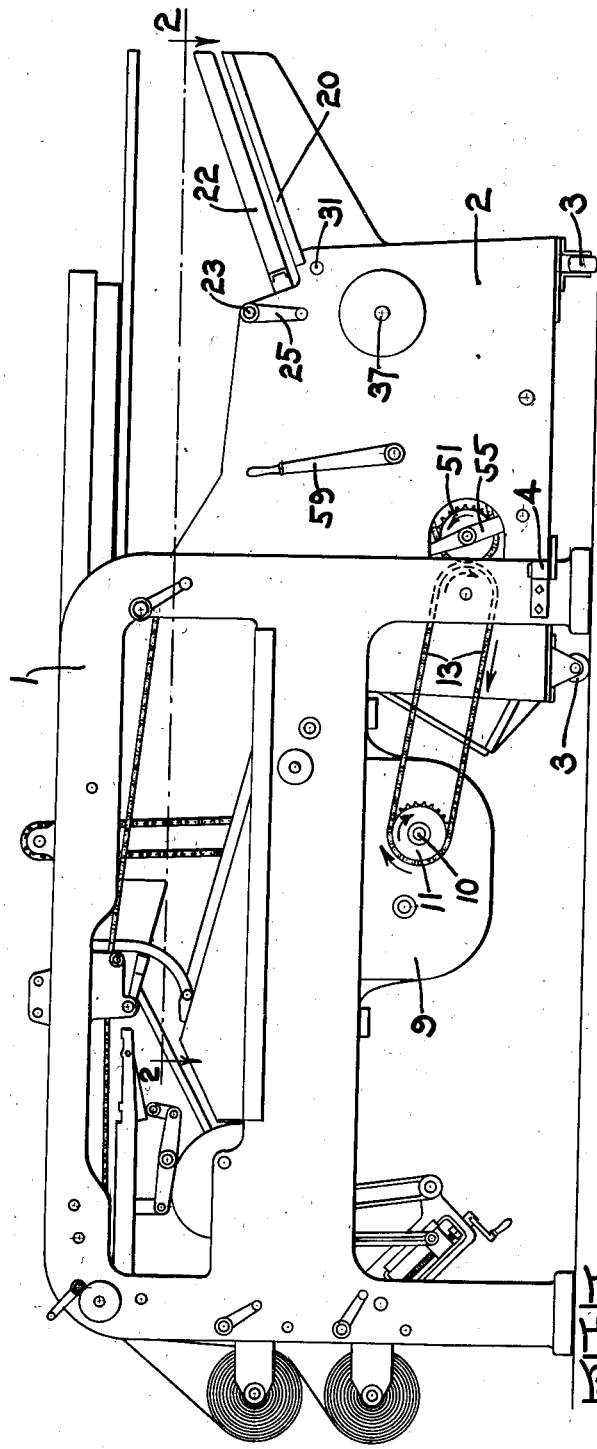
Fig. 1 is a side elevation of a bread wrapper and slicing unit embodying this invention.

The bread wrapper unit has a main frame designated as 1 and the slicer unit has a main frame designated as 2. The frame 1 of the wrapper unit rests upon feet upon the floor and is not intended to be moved after it has been located but the slicer unit is supported upon the floor on castors 3 whereby it may be rolled to different positions and it is pivotally connected to the frame 1 of the wrapping unit by a hinge 4 and is yieldably held in operative position by a spring 5 on the wrapping unit frame 1 which engages a pin 6 on the slicing unit frame 2.

Power to drive the bread wrapping unit and the loaf feeding mechanism of the slicer unit is derived from any suitable source such as an electric motor shown at 7 which through a belt 8 drives gears in a gear reduction box 9 from which power is transmitted to rotate the main drive shaft 10. It is recognized that the disclosure of this source of power and gear reduction is not herein definitely disclosed in detail but this specific mechanism forms no part of the present invention, it merely being necessary that power is applied to rotate the shaft 10, and during operation of the machine the shaft 10 rotates constantly.

A sprocket 11 on the shaft 10 drives the sprocket 12 by means of a chain 13 and a gear 14 is fixed to the sprocket 12 and rotates therewith on a stub shaft 15 mounted on the frame 1 of the wrapping unit. This gear 14 meshes with the gear 16 which drives the loaf feeding mechanism of the slicing unit as hereafter described.

An inclined chute 20 is provided in the slicing unit the upper end of which is widened in the nature of a work table 21 and the loaves of bread to be sliced and wrapped are introduced into the machine by manually placing them in the chute. The chute has the inclined bottom 20 and vertical side walls or guides 22. These guides 22 are hung near their longitudinal centers upon a shaft 23 rotatably mounted in the frame 2 of the slicing unit and having right and left hand threads respectively at opposite sides of its center and correspondingly threaded nuts 24 mounted on the threaded portions of the shaft 23 and attached to the respective guides 22. A crank 25 on the shaft 23 is used to rotate it for the purpose of adjusting the distance between the side walls 22 of the chute and their major portions are adjusted to have a space between them equal to the overall lengthwise dimension of the size of the loaf being operated upon. A supporting rod 26 extends across the machine above the guides 22 and the guides are slidably mounted upon it for support.

At the lower inner end of the chute a loaf elevator 28 is provided and beyond the elevator is located a substantially vertical stop plate 29. The loaves move by gravity downward in the chute, the lowermost loaf coming to rest upon the elevator 28 and stopping against the stop plate 29.

The elevator 28 comprises an arm 30 pivoted to the frame of the machine on the shaft 31. The elevator has two fixed platforms 32 and a movable platform 33 for adjustment of the width of the elevator to accommodate the size of loaf being operated upon the movable platform 33 being adjusted by a screw threaded shaft 34 mounted on the arm 30 and rotated by a crank 35. A cam 36 mounted on a shaft 37 acts upon a cam roller 38 fixed to the arm 30 and oscillates the arm as the cam rotates imparting a substantially vertical reciprocating movement to the elevator which consecutively raises loaves from the plane of the lower end of the chute to an elevated position.

The guides 22 are widened at their lower forward ends so that they will extend above the position to which the elevator rises and will guide the loaves against endwise movement during the elevating and in the elevated position. A pusher 40 is mounted on tracks 41 for reciprocation and moves in the path of the elevated position of the loaf.

The pusher 40 is operated by a cam 42 fixed to the shaft 37 and a cam roller 43 rides in the cam 42 and is mounted on a bell crank 44 which is pivoted on the shaft 31 which extends across the machine. A connecting link 45 is attached to the opposite arm of the bell crank 44 and is connected to a lever 46 fixed to a rock shaft 47 mounted in the frame of the machine. A lever 48 is connected to the lever 46 and moves with it and a connecting link 49 is attached to the upper swinging end of the lever 48 and also to the frame of the pusher 40. These parts are mounted near one side of the machine and at the opposite side substantially duplicate parts 46a, 48a and 49a are provided to connect and operate the opposite end of the frame of the pusher 40.

The shaft 37 is rotated by a chain 50 passing over a sprocket wheel 51 attached to the gear 16 and over a sprocket wheel 52 fixed to the shaft 37. Since the gear 16 is driven from the mechanism of the wrapping unit the loaf elevating and feeding mechanism will operate at a predetermined speed ratio therewith. The gear 16 is mounted on a lever 55 pivoted to the frame of the machine and connected by a link 56 to a lever 57 on a shaft 58 operated by a hand lever 59. By movement of the hand lever 59 the gear 16 may be moved out of mesh with the gear 14 thus stopping the feeding operation of the slicing machine while the main driving mechanism is in operation which may be desirable under certain conditions.

Since the elevator 28 and loaf pusher 40 are operated respectively by the cams 36 and 42 which are mounted on the sam shaft 37 and rotate therewith their movements are necessarily synchronized. The elevator lifts the loaf upwardly and, because of a dwell in the cam 36, holds it elevated as the pusher 40 is moved forwardly and pushes the loaf from the elevator onto a platform.

The pusher 40 moves the loaf into and partly through the slicing knives, hereafter described, and it is desired that the limit of its forward movement be uniform and close to the knives regardless of the width of the loaf being operated upon. The rear position or limit of movement of the pusher 40 should be varied with respect to the width of the loaf and for that purpose the end of the link 45 is adjustably connected to the link 44. This adjustable connection consists of a bolt 60 passing through an arcuate slot 61 in the bell crank 44. The center of the radius of the arcuate slot 61 is the axis of the pivotal connection of the opposite end of the link 45 with the lever 46 when the parts are in position to locate the pusher 40 at the forward limit of its movement.

By this arrangement the forward limit of movement of the pusher is not disturbed by adjustment of the connection of the link 45 to the bell crank 44 but the length of stroke of the pusher is varied by this adjustment and the rearward limit of its movement is changed. The levers 46 and 46a are adjustably connected with the levers 48 and 48a by bolts 63 and 63a, this adjustment being for the purpose of adjusting the forward position of pusher 40 with respect to the slicing knives. If this adjustment is not altered this forward position of the pusher 40 is not changed by adjusting its length of stroke as above described.

Certain types of loaves of bread bulge considerably at their upper sides and ends. This is caused by a swelling of the dough where it rises above the pan in which it is baked. With this type of loaf the lower part is of uniform length but the upper part bulges or overhangs. To accommodate this type of loaf the guides 22 are spaced apart sufficient to accommodate the full length of the bulging loaf, however, that part of the guide 22 which engages the loaf when in elevated position is narrow and engages only that uniform length of the loaf below the bulging part and therefore the forward ends of the guides 22 are curved inwardly so that when the loaf is pushed forwardly into the knives it will be guided by the inwardly curved portions of the guide 22 which engage the uniform portion of the loaf and thus when entering the knives the loaves are accurately guided. With this style of loaf the overhanging end portions are usually sliced off and discarded before the loaf enters the wrapping unit.

The slicing knives 65 extend through the table 66 onto which the loaves are moved by the pusher 40 and are preferably diagonally arranged relative to the table. The knives 65 are arranged in two groups each group being mounted in one of the respective frames 67. Any conventional means for mounting the knives in the frames may be used. Each frame has blocks 68 at its upper end and each block is provided with an opening through which a pin 69 passes, the pins 69 being mounted on the frame of the machine. A pin 69 and block 68 are provided at the upper edge of each side of each frame and these guide the upper ends of the frames in their reciprocating movements.

At the lower part of the machine is a reciprocating mechanism mounted within a housing 70 and operated by an electric motor 71 through a belt 72. This reciprocating mechanism is not illustrated specifically and forms no part of the present invention. It is merely necessary that it operate to oppositely reciprocate two plungers 73 and 74 which project from the upper end of the housing 70. The lower ends of the knife frames 67 are detachably connected to the respective plungers 73 and 74 by bolts 75 and 76 and the plungers 73 and 74 are accurately guided in their reciprocating movements and thus the lower ends of the frames 66 and 67 are likewise accurately guided.

It is necessary to frequently remove the knife frames for repair or sharpening the knives or for changing the spaces between the knives and this removal and replacement is easily accomplished in this machine by merely disconnecting the knife frames from the plungers and slipping them upward to remove the blocks 68 from the pins 69 which entirely releases the frames carrying the knives. This ease of removal and replacement of the knife frames is greatly enhanced in this machine by swinging the slicing unit with respect to the wrapping unit which gives ready access to these parts.

The loaves on the table 66 after having been sliced by being passed through the knives are moved toward the wrapping unit by succeeding loaves being pushed through the knives and eventually are deposited upon a conveyor table 80 in the wrapping unit where they engage trip fingers 81 which act to engage a single cycle clutch which drives the wrapping mechanism from the shaft 10 through a single loaf wrapping operation and as loaves are continued to be deposited upon the table 80 and engage the trip fingers 81 the said clutch will be caused to remain in engagement and the wrapping mechanism will operate continuously but if a loaf fails to be delivered upon the table 80 and to trip the fingers 81 before disengagement of said clutch at the end of a wrapping operation the bread wrapper will stop operation and will not start again until a loaf of bread has been deposited on the table 80.

The essence of this invention is to provide a combined bread slicing and bread wrapping machine which may be operated for the purposes heretofore described and which are driven from the same source of power and at the same speed ratios and also to provide means for causing proper coaction between the slicing unit and the wrapping unit without the necessity of synchronized movements of parts of the two units. By the means provided the driving connections between the two units may be separated and re-engaged without the necessity of maintaining the same synchronized relationship between the driving parts.

So far as this invention is concerned the wrapping mechanism need only to comprise competent bread wrapping machinery of any desired specific form which is supplied with a single cycle clutch thrown into engagement by the deposit of a loaf of bread into the wrapping unit from the slicing unit. For the sake of a complete disclosure the essential parts of a bread wrapping unit have been herein shown in detail but the specific mechanism of these parts may be varied without departing from the spirit of the invention.

As previously stated, the main drive shaft 10 rotates constantly while the machine is in operation. This shaft also constantly drives the elevator and pusher of the slicing machine through the mechanism heretofore described and certain delivery belts 85 in the wrapping mechanism through a chain 86 passing over a sprocket 87 on the shaft 10 which delivery belts are not relevant to 'the present invention. The main bread wrapping machinery and loaf conveying mechanism, however, are not constantly driven by the shaft 10 but are only actuated by deposit of a loaf upon the conveyor table 80.

The conveyor is moved by a cam 90 and the main bread wrapping mechanism is actuated by a chain 91 passing over a sprocket 92, the cam 90 and the sprocket 92 being mounted on the shaft 10 but normally disconnected therefrom. Driving connection between the shaft 10 and the sprocket 92 and cam 90 is made by a single cycle clutch best illustrated in Figs. 5, 6 and 7. This clutch comprises a notched disk 93 fixed to the shaft 10. An arm 94 is pivotally connected to the face of the sprocket 92 and the sprocket 92 and cam 90 are connected together so that rotation of the sprocket will cause like rotation of the cam 90. The swinging end of the arm 94 is provided with a pin 95 which can move into one of the notches of the disk 93 and when so moved it will constitute a driving connection between the disk 93 and the sprocket 92. A spring 96 yieldably moves the arm to cause the pin 95 to enter a notch in the disk 93.

A cam roller 97 extends from the movable end of the arm 94 into the path of a cam 98 mounted on a pivoted bell crank lever 99 pivoted at 100 to a plate 101 fixed to the frame 1 of the machine. The opposite arm of the bell crank lever 99 is connected by toggle levers 102 and 103 to the plate 101 at 104.

When the toggle levers 102 and 103 are in alined position they will firmly hold the cam 98 in elevated position so that engagement of the cam roller 97 with the cam will lift the arm 94 and raise the pin 95 out of engagement with the disk 93. This position of the toggle levers 102 and 103 is attained by a weight 105 hung on a rod 103.

The rod 106 is also connected to the armature 107 of a solenoid magnet 108 and when this magnet is energized it will lift the rod 106 and move the toggle levers 102 and 103 out of alined position permitting the bell crank lever 99 to move to lower the cam 98 and permitting the pin 95 to enter a notch in the disk 93 to cause the aforementioned driving connection.

The plate 101 has an opening 110 in the plane of the cam roller 97. The shape of this opening 110 is mostly circular concentric with the axis of the shaft 10 but opposite the cam 98 it has an outwardly extending portion to permit the cam roller 97 to be raised by the cam 98 but after the cam roller has been lowered and rotated with the disk 93 it will enter the concentric portion of the opening 110 which is of proper diameter to retain the cam roller 97 in its inward position toward the shaft 10 and to retain the pin 95 in its engagement with the plate 93.

When the cam 90 is rotated it oscillates a gear segment 115 which is pivotally connected to the frame at 116. This oscillation is accomplished by a cam roller 117 fixed to the gear segment and moving in a groove in the cam 90. The segment 115 meshes with the pinion 118 loosely mounted upon the shaft 119 adjacent the hub of a sprocket 120 also mounted on and fixed to the shaft 119. A one way clutch element of conventional nature serves to connect the pinion 118 with the sprocket 120 when the gear segment 115 moves downwardly to rotate the shaft 119 but when the segment 115 moves upwardly the pinion 118 is moved in the other direction and releases its connection from the sprocket 120 and rotates freely on the shaft.

Sprockets 120 are fixed to the shaft 119 at opposite sides of the conveyor table 80 and endless chains 121 run over these sprockets 120 and also over sprockets 122 located at the upper end of the table 20. Cross bars 123 extend between the respective chains 121 and are moved adjacent the upper face of the table 80 when the sprockets 120 are rotated and the cross bars 123 engage loaves of bread which are deposited upon the table and move them upwardly. From the upper end of the table 80 the loaves are deposited into the mechanism of the bread wrapping machine which specifically forms no part of this invention and is not herein illustrated.

The trip fingers 81 which project upwardly through slots in the table 80 are connected together as a single unit and pivotally mounted on a shaft 125. The shaft 125 is mounted in a frame 126 which is slidably mounted on rods 127 and 128 on the under side of the table 80. The frame 126 is provided with a rack 129 and a pinion 130 meshes with the rack and is formed on one end of a manually rotatable shaft 131 provided with a knob 132 so that rotation of the knob 132 will slide the frame 126 and adjust the positions of the fingers 81 longitudinally of the table 80.

An electric switch in the nature of a mercury tube 135 is mounted on the trip finger 81 assembly and tips about the shaft 125 when the fingers move. A weight 136 is also provided as a part of the swinging assembly and tends to maintain the fingers 81 in raised position above the surface of the table 80 but the weight of a loaf of bread deposited upon the table and engaging the fingers 81 will depress them and swing the assembly comprising said fingers, the weight 136 and the mercury tube switch 135.

The mercury tube switch 135, which is well known in the art, has its circuit closing electrodes arranged to be engaged by the mercury in the tube to close an electric circuit when the trip fingers 81 are depressed and electric conductor wires 137 connect this switch with the solenoid magnet 108 and a suitable source of electric energy, not shown, so that when the circuit is closed in the mercury tube 135 the solenoid magnet 109 will be energized lifting the weight 105 and engaging the single cycle clutch as heretofore described causing the bread wrapping mechanism to operate.

Therefore, it will be seen that as loaves of bread are deposited from the table 66 of the slicing unit onto the conveyor table 80 of the wrapper unit and engage the trip fingers 81 the wrapping machine will be caused to actuate conveying the loaves into the wrapping mechanism and wrapping them. However because of the single cycle clutch which is actuated by loaves deposited in the wrapping unit the wrapping machine will only operate a single cycle for each loaf of bread deposited into it and if the operator fails to keep loaves supplied to the slicing unit so that it will operate continuously on successive loaves, or if the slicing unit does not operate upon and deposit loaves into the wrapping machine at a speed equal to the capacity of the wrapping machine the wrapping unit will cease its operation until it is properly supplied with loaves to operate upon.

By this means it will be seen that no certain synchronism of movements of the parts of the slicing unit and the wrapping unit is necessary. The slicing unit may be swung away from the wrapping unit disconnecting the driving gears 14 and 16 and when replaced and the gears are remeshed it is not important that they be meshed in the same relation as they had previously been.

Although this machine has been described and illustrated as a combination slicing and wrapping machine it is conceived that other devices may be substituted for the slicing machine which will prepare the loaves of bread or articles for wrapping and deposit them periodically into the wrapping unit within the scope of this invention in its broader sense. Also it is conceived that other articles than loaves of bread may be subjected to the desired preparatory operations by proper machinery and periodically delivered into the wrapping unit and wrapped thereby.

We claim:

1. The combination with a wrapping machine and an article preparing machine of disconnectable means for holding said machines together in operating relation and for permitting separation of the two machines disconnectable driving means for transmitting movement from one machine to the other at a fixed sped ratio, and means actuated by the deposit of an article into said wrapping machine for causing the wrapping machine to operate through a single cycle of movements.

2. The elements in combination defined in claim 1 in which said means for transmitting movement comprises a driving gear on one unit and a driven gear on the other unit which gears are in mesh when the units are in operating relation to each other and which gears become unmeshed when said units are moved relative to each other.

3. The elements in combination defined in claim 1 in which the means for transmitting movement between the two machines operate respectively in fixed speed ratio with the wrapping mechanism of the wrapping machine and with the article delivering mechanism of the preparing machine.

4. The combination with a wrapping unit having a wrapping mechanism and an article preparing unit having an article delivering mechanism, of detachable means for holding said units in operative relation with each other and for permitting movement of one unit relative to the other, a gear on said wrapping unit connected to rotate in timed relation with said wrapping mechanism, a gear on said preparing unit connected to rotate in timed relation with said article delivering mechanism, said gears being in mesh when said units are in operative relation to each other and becoming unmeshed when said units are moved relative to each other, and means actuated by the deposit of an article into said wrapping machine for causing the wrapping machine to operate through a single cycle of movements.

5. The combination with an article wrapping unit having wrapping mechanism and an article preparing unit having an article delivering mechanism, of detachable means for holding said units in operative relation in which said article delivering mechanism periodically delivers articles into said wrapping unit, continuously moving means for transmitting power from one unit to the other, said power transmitting means moving in fixed speed ratio with said article delivering mechanism, controlled means to operate said wrapping mechanism through a single cycle of movements in fixed speed ratio with said power transmitting means and means actuated by deposit of an article into said wrapping unit for causing said wrapping mechanism to operate through said single cycle.

6. The elements in combination defined in claim 5 in which the speed of operation of said article delivering means is no greater than the capacity of said wrapping mechanism.

7. The elements in combination defined in claim 5 in which said wrapping unit and preparing unit are separable from each other and said power transmitting means is separated and inoperable when said units are separated.

8. The elements in combination defined in claim 5 in which said wrapping unit and said preparing unit are separable from each other and said power transmitting means comprises a gear on each unit which is in mesh when said units are in operative relation to each other and which become unmeshed when said units are separated from each other.

9. The combination with an article wrapping unit having wrapping mechanism and an article preparing unit having article delivering mechanism, of detachable means for holding said units in operative relation in which said delivering mechanism periodically delivers articles into said wrapping mechanism, said detachable holding means permitting separation of said units, continuously moving power driven means in said wrapping unit, separable means for transmitting power from said continuously moving means to said article delivering mechanism of said preparing unit which power transmitting means moves in fixed speed ratio to said continuously moving means and means controlled by deposit of an article from said delivering mechanism of said preparing unit into said wrapping unit for causing said wrapping mechanism to be driven through a single cycle of movements by said continuously moving means and in fixed speed ratio therewith.

10. The elements in combination defined in claim 9 in which the speed of operation of the article delivery mechanism is no greater than the capacity of said wrapping mechanism.

11. The combination with an article wrapping unit and an article preparing unit each having a frame containing mechanism and having a relatively open end through which access to said mechanism for adjustment and repair may be had, together with wrapping mechanism in said wrapping unit, and an article delivering mechanism in said preparing unit, of means for detachably holding the frames of said respective units in operative relation to each other with said respective open ends contiguous in which relation said article delivering mechanism delivers articles periodically into said wrapping unit, said holding means permitting movement of said units relative to each other to positions in which their respective open ends are exposed for access to the mechanisms within the respective frames, and means for transmitting power from one unit to the other, said power transmitting means operating in fixed speed ratio with said wrapping mechanism and said article delivery mechanism respectively, said power transmitting means being separable and inoperative when said units are moved relative to each other out of operative relation.

12. The elements defined in claim 11 combined with normally inoperative means for operating said wrapping mechanism and means controlled by deposit of an article into said wrapping unit for causing said means to operate said wrapping mechanism through a single cycle of operations in fixed speed ratio with said power transmitting means.

13. The combination with a wrapping unit having wrapping mechanism therein and an article preparing unit having an article delivering mechanism therein, of a pivotal connection between said units, detachable means for holding said units in operative relation relative to each other and for permitting said units to be swung on said pivot relative to each other into inoperative relation, a gear on each of said units in meshing relation to each other when said units are in said operating relation, said gears becoming unmeshed when said units are swung to inoperative relation, means for driving said delivering mechanism at a fixed speed ratio to said gears, normally inoperative means for actuating said wrapping mechanism and means controlled by depositing an article into said wrapping unit by said delivery mechanism for causing said actuating means to operate said wrapping mechanism through a single cycle of operation in fixed speed ratio to said gears.

14. The elements in combination defined in claim 13 in which the speed of operation of said delivering mechanism is no greater than the capacity of said wrapping mechanism.

15. The combination with a wrapping unit and a slicing unit, each of said units having a frame with a substantially open end, of a pivotal connection having a vertical axis connecting the frames of the respective units at a single vertical edge of each in a manner to permit said frames to be moved into operative alinement with their respective open ends in contiguous relation and to permit one of said frames to be swung relative to the other to expose said open ends, supporting means on said movable frame remote from said pivotal connection adapted to traverse a floor upon which said units are supported, wrapping mechanism in said wrapping unit, continuously operating driving mechanism in said wrapping unit, normally inoperative means to actuate said wrapping mechanism, means actuated by depositing an article into said wrapping unit to cause said driving means to actuate said wrapping mechanism through a single cycle of movements, a gear on said wrapping unit constantly driven by said driving means, a second gear on said slicing unit meshing with said first gear when said units are in operative relation relative to each other and becoming unmeshed when one of said units is swung out of operative relation relative to the other, slicing means in said slicing unit and means actuated by said second gear for feeding articles periodically through said slicing means and into said wrapping unit.

16. The elements defined in claim 15 in which said slicing means is accessible through the open end of the frame of said slicing unit when said frame is swung away from said wrapping unit to a position to expose said open end.

17. The elements in combination defined in claim 15 in which said slicing means comprises knife frames and means for detachably mounting the same, said detachable means being accessible through the open end of the frame of said slicing unit when said frame is swung relative to said wrapping unit to expose the same.

HOWARD B. TUTHILL.
HARRY F. CALDWELL.